(12) United States Patent
Miyazaki et al.

(10) Patent No.: US 9,946,137 B2
(45) Date of Patent: Apr. 17, 2018

(54) ELECTROCHROMIC ELEMENT, LENS UNIT, IMAGING DEVICE, AND WINDOW MEMBER

(71) Applicant: CANON KABUSHIKI KAISHA, Tokyo (JP)

(72) Inventors: Kazuya Miyazaki, Kunitachi (JP); Shinjiro Okada, Kamakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/089,056

(22) Filed: Apr. 1, 2016

(65) Prior Publication Data

US 2016/0299400 A1 Oct. 13, 2016

(30) Foreign Application Priority Data

Apr. 8, 2015 (JP) .................. 2015-079477

(51) Int. Cl.
| | | |
|---|---|---|
| G02F 1/155 | (2006.01) | |
| G02F 1/163 | (2006.01) | |
| G02F 1/157 | (2006.01) | |
| H04N 5/225 | (2006.01) | |

(52) U.S. Cl.
CPC .............. *G02F 1/155* (2013.01); *G02F 1/157* (2013.01); *G02F 1/163* (2013.01); *H04N 5/2254* (2013.01)

(58) Field of Classification Search
CPC .......... G02F 1/155; G02F 1/163; G02F 1/157; H04N 5/2254

USPC .................. 359/265–275; 345/105
See application file for complete search history.

(56) References Cited

U.S. PATENT DOCUMENTS

2012/0025061 A1* 2/2012 Izuha ................... H04N 5/3698
250/208.1
2014/0043668 A1* 2/2014 Bergh ..................... G02F 1/153
359/265

FOREIGN PATENT DOCUMENTS

JP 2005-321521 A 11/2005
WO 2011085917 A1 7/2011

* cited by examiner

*Primary Examiner* — Tuyen Tra
(74) *Attorney, Agent, or Firm* — Canon U.S.A., Inc. IP Division

(57) ABSTRACT

Potential non-uniformity in a surface of an electrode in an electrochromic element is improved during coloring and color erasing. The electrochromic element includes a pair of transparent electrodes and an electrochromic layer placed between the transparent electrodes. Each of the transparent electrodes includes an end portion having an electric supply portion. The electric supply portions face each other. The surface resistivity of each of the transparent electrodes increases with the increase of the distance from a corresponding one of the electric supply portions. The potential of the transparent electrodes is such that the difference between the maximum and minimum potentials in a surface of each transparent electrode is less than or equal to a predetermined value.

15 Claims, 9 Drawing Sheets

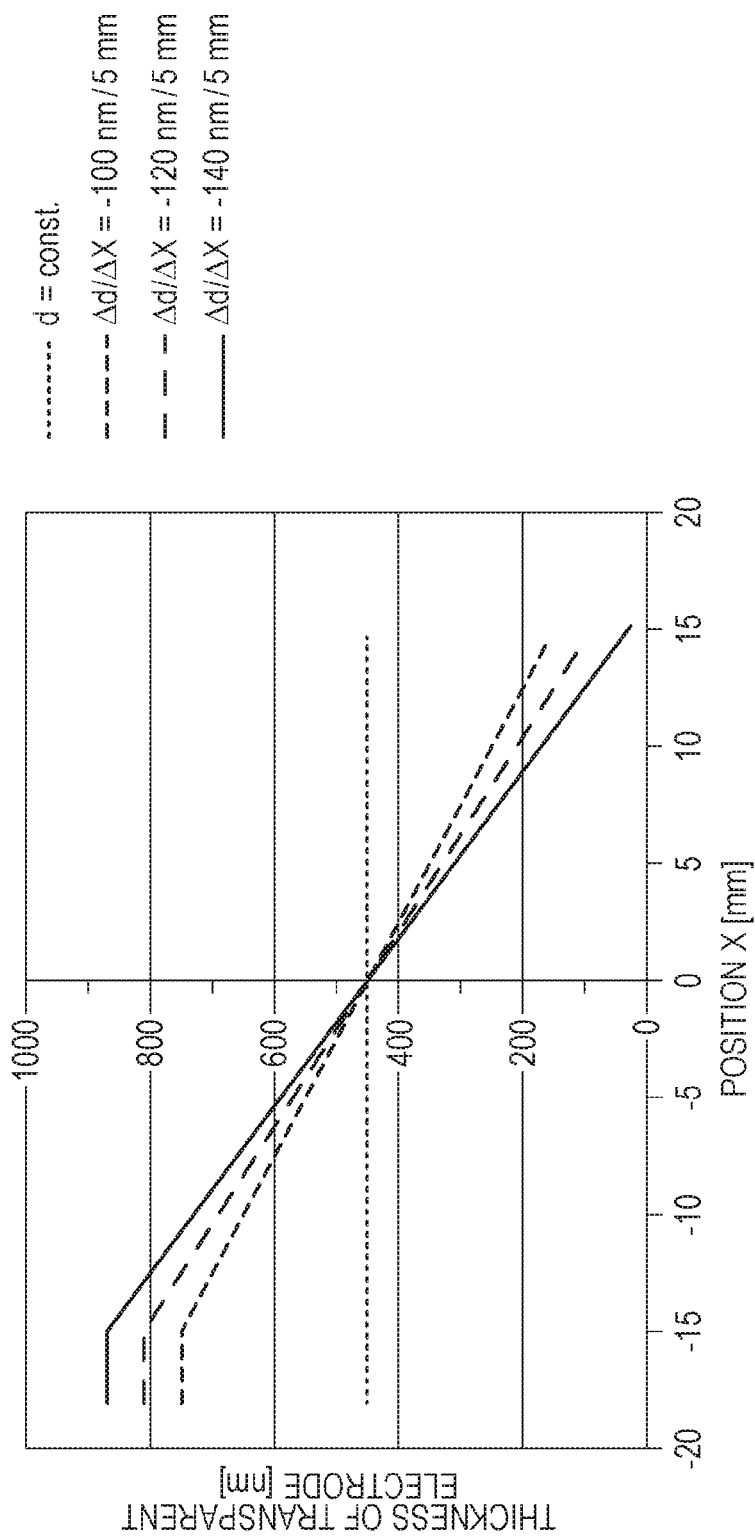

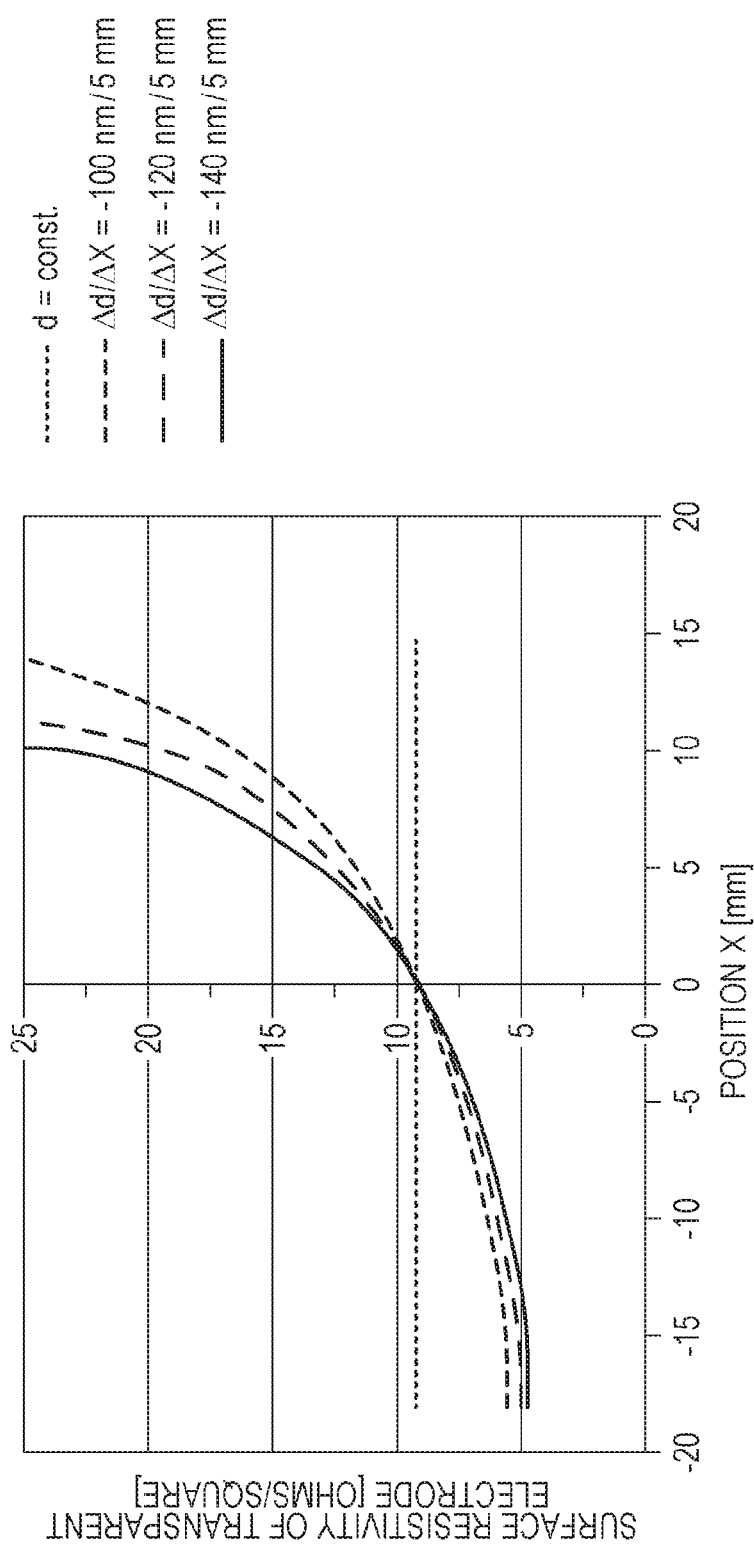

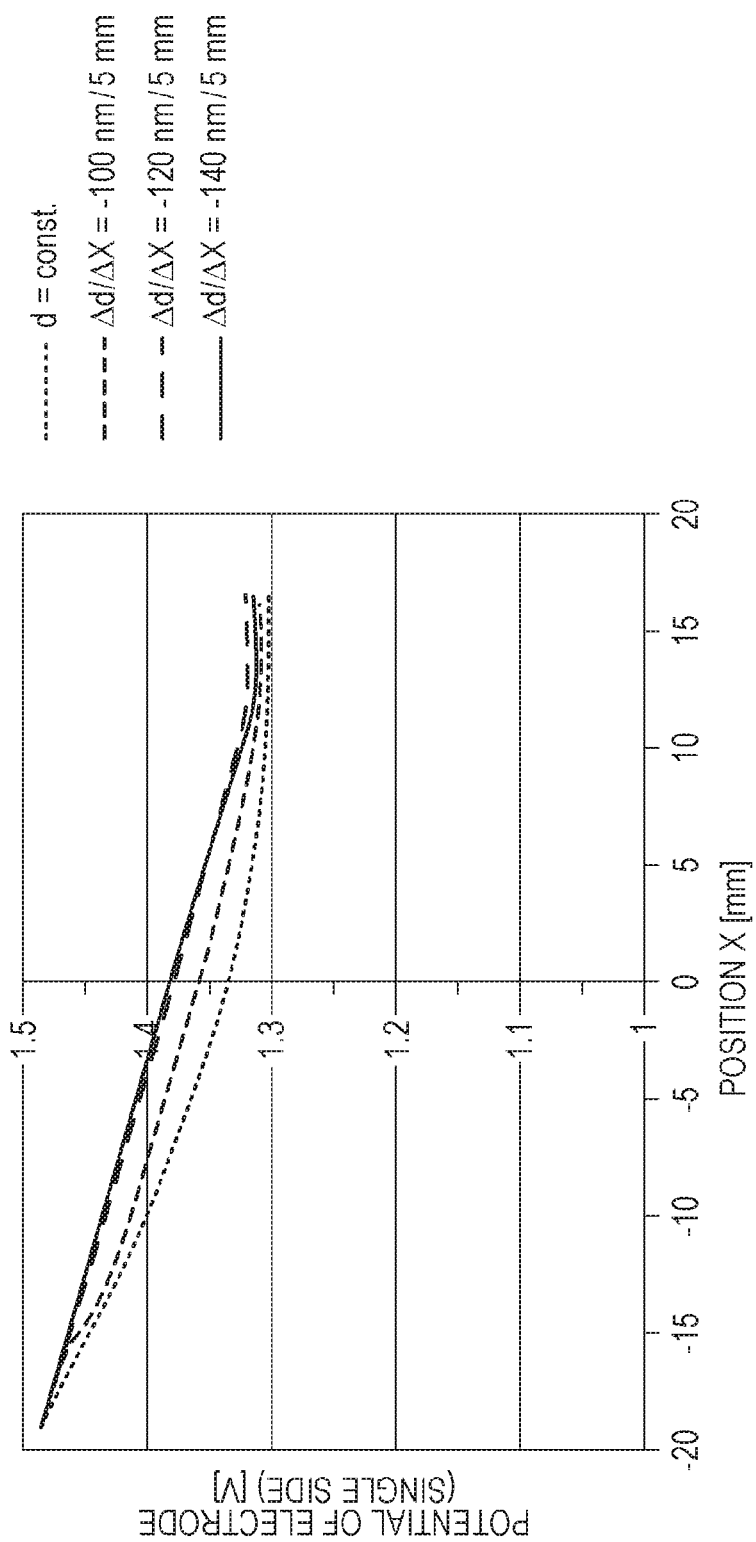

ELECTROCHROMIC ELEMENT, LENS UNIT, IMAGING DEVICE, AND WINDOW MEMBER

BACKGROUND OF THE INVENTION

Field of the Invention

One disclosed aspect of the embodiments relates to an electrochromic element controlling the intensity and color of light, a lens unit including the electrochromic element, an imaging device including the electrochromic element, and a window member including the electrochromic element.

Description of the Related Art

Electrochromic elements are those including a pair of electrodes and an electrochromic layer placed between the electrodes. The amount of light passing through the electrodes can be regulated in such a manner that the transmittance of a compound in the electrochromic layer is varied by applying a voltage to the electrochromic layer from the electrodes.

In recent years, in videographic systems including a solid-state imaging element, there have been increasing demands for variable neutral density (ND) filters capable of steplessly regulating optical density. Many optical elements containing a liquid crystal or including an inorganic electrochromic thin-film have been proposed for this application. However, the optical elements are inferior in light regulation range or reliability to known ND filters and therefore have not been widely used.

Meanwhile, optical elements containing organic electrochromic molecules have a wide light regulation range, are easy in designing spectral transmittance, and therefore are particularly promising for applications such as variable ND filters mounted in imaging devices.

An electrochromic element includes an electrochemically active anodic material and electrochemically active cathodic material placed between a pair of electrodes. At least one of the electrochemically active anodic and cathodic materials is an electrochromic material, that is, a material that exhibits an absorption band in the visible light region by electrochemical oxidation or reduction. The oxidation of the anodic material and the reduction of the cathodic material occur simultaneously on the electrodes. This forms a closed circuit in the electrochromic element to allow a current to flow.

When the electrochromic element has a large area, the influence of a voltage drop in a surface of each electrode is particularly large. This is because the resistivity of a material contained in the electrode is two orders of magnitude greater than that of metal.

International publication No. WO 2011/085917 (hereinafter referred to as Patent Document 1) discloses a light-emitting element in which the luminance in a surface of an electrode is made uniform in such a manner that a voltage drop gradient is compensated for by monotonically varying the conductivity of the electrode in proportion to the distance from an electrical terminal.

Japanese Patent Laid-Open No. 2005-321521 (hereinafter referred to as Patent Document 2) discloses an electrochromic element in which the influence of a voltage drop is reduced by regulating the ratio of the resistance of an electrode to the resistance of a solution such that non-uniformity during coloring is improved.

The light-emitting element disclosed in Patent Document 1 is one that reduces the voltage drop in a surface of an electrode to achieve uniform light emission. Patent Document 1 does not describe how to reduce the transmittance non-uniformity of light passing through the electrode in the electrode surface. Therefore, the light-emitting element cannot reduce transmittance non-uniformity.

Patent Document 2 describes that the coloring uniformity of the electrochromic element is increased by regulating the relationship between the resistance of a pair of electrodes, the length of the electrodes, the electrical conductivity of an electrolytic solution, and the distance between the electrodes. However, regulating the relationship therebetween reduces the degree of freedom in configuration of the electrochromic element.

SUMMARY OF THE INVENTION

An embodiment of the disclosure provides an electrochromic element in which the resistivity of a pair of electrodes is varied depending on the distance from an electric supply portion such that transmittance non-uniformity in a surface of each electrode is reduced.

An electrochromic element according to an embodiment of the disclosure includes a pair of transparent electrodes and an electrochromic layer placed between the transparent electrodes. Each of the transparent electrodes includes an end portion having an electric supply portion. The electric supply portions face each other. The surface resistivity of each of the transparent electrodes increases with the increase of the distance from a corresponding one of the electric supply portions. The potential of the transparent electrodes is such that the difference between the maximum and minimum potentials in a surface of each transparent electrode is less than or equal to a predetermined value or amount. In one embodiment, this predetermined value or amount is 20 mV.

Further features of the disclosure will become apparent from the following description of exemplary embodiments with reference to the attached drawings.

BRIEF DESCRIPTION OF THE DRAWINGS

FIG. 2 is a graph showing the relationship between a position X in a surface of each transparent electrode and the thickness of the transparent electrode.

FIG. 3 is a graph showing the relationship between a position X in a surface of each transparent electrode and the surface resistivity of the transparent electrode.

FIG. 4 is a graph showing the relationship between a position X in a surface of each transparent electrode and the potential of the transparent electrode.

DESCRIPTION OF THE EMBODIMENTS

The configuration of an electrochromic element according to an embodiment of the disclosure is exemplified below in detail with reference to the attached drawings.

The electrochromic element includes a pair of transparent electrodes, an electrochromic layer placed between the transparent electrodes, and electric supply portions each of which is attached to a corresponding one of the transparent electrodes. Each of the electric supply portions is attached to an end portion of a corresponding one of the transparent electrodes. The end portions of the transparent electrodes face each other.

The transparent electrodes are configured such that the resistivity of each of the transparent electrodes varies depending on the distance from a corresponding one of the electric supply portions. This configuration enables the non-uniformity of the potential between the transparent electrodes to be reduced. The non-uniformity of the potential between the transparent electrodes is a cause of transmittance non-uniformity in a direction perpendicular to a principal surface of each transparent electrode.

The difference between the maximum and minimum transmittances in the direction perpendicular to the principal surface of the transparent electrode is preferably 5% or less. Therefore, the potential of the transparent electrodes is such that the difference between the maximum and minimum potentials in a surface of each transparent electrode is preferably less than or equal to a predetermined value. In one embodiment, this predetermined value is 20 mV.

According to the one embodiment, when the distance between the electric supply portions is 30 mm or less, the transmittance non-uniformity of the electrochromic element can be reduced.

In the electrochromic element, the distance between the electric supply portions is preferably 30 mm or less.

The term "transparent" as used herein means that the transmittance is 90% or more.

First Embodiment

An electrochromic element according to a first embodiment includes a pair of transparent electrodes, an electrochromic layer placed between the transparent electrodes, and electric supply portions each of which is attached to a corresponding one of the transparent electrodes. In the electrochromic element, the thickness of each of the transparent electrodes decreases with the increase of the distance from a corresponding one of the electric supply portions. In this embodiment, the distance from each of the electric supply portions is proportional to the thickness of a corresponding one of the transparent electrodes.

Figure 1A:
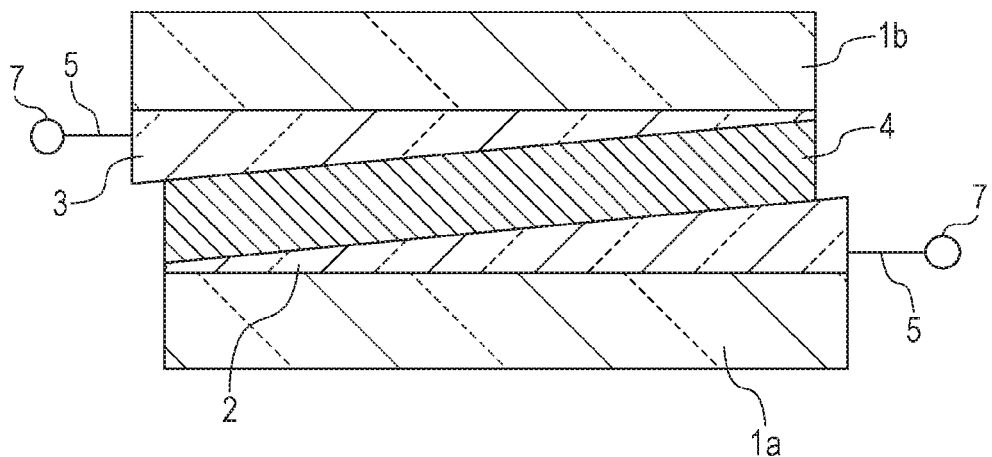
FIG. 1A is a schematic view of an electrochromic element according to a first embodiment.

FIG. 1A is a schematic view of an example of the electrochromic element. Reference numerals 1a and 1b each represent a transparent substrate, reference numeral 2 represents a first transparent electrode, reference numeral 3 represents a second transparent electrode, reference numeral 4 represents the electrochromic element, reference numeral 5 represents the electric supply portions, and reference numeral 7 represents connecting portions. The first and second transparent electrodes 2 and 3 are collectively referred to as the transparent electrodes in some cases. The transparent electrodes may be made of the same material or different materials. In this embodiment, the transparent electrodes are made of the same material.

In this embodiment, the transparent electrodes have a size of, for example, 32 mm×45 mm.

The thickness of each of the transparent electrodes is preferably proportional to the distance from a corresponding one of the electric supply portions 5. In addition, the thicknesses of the transparent electrodes are preferably proportional to each other at the same inclination. The fact that the thickness of each of the transparent electrodes decreases in proportion to the distance from a corresponding one of the electric supply portions 5 can be expressed as that the surface resistivity of each of the transparent electrodes increases in proportion to the distance from a corresponding one of the electric supply portions 5.

FIG. 2 is a graph showing the relationship between the distance from each of electric supply portions and the thickness of a corresponding one of transparent electrodes. The distance from each of the electric supply portions can be translated into a position in a surface of a corresponding one of the transparent electrodes.

In FIG. 2, the abscissa axis is set such that X=0 is the center of each transparent electrode in an X-axis direction, the ordinate axis represents the thickness of the transparent electrode, and X=−18 mm is an electric supply portion. Three types of transparent electrodes different in thickness gradient and transparent electrodes constant in thickness are shown in FIG. 2. The thickness gradient of the transparent electrodes different in thickness gradient is −100 nm/5 mm, −120 nm/5 mm, or −140 nm/5 mm. The thickness of the transparent electrodes constant in thickness is 450 nm. The term "−100 nm/5 mm" means that the thickness of an electrode decreases by 100 nm at a distance of 5 mm away from an electric supply portion.

FIG. 3 is a graph showing the relationship between the distance from each of electric supply portions and the surface resistivity of a corresponding one of transparent electrodes. Three types of transparent electrodes different in thickness gradient and transparent electrodes constant in thickness are shown in FIG. 3, as well as FIG. 2.

As is clear from FIGS. 2 and 3, in the case where the thickness of each of the transparent electrodes is reduced with the increase of the distance from a corresponding one of the electric supply portions, the surface resistivity of each of the transparent electrodes increases with the increase of the distance from a corresponding one of the electric supply portions.

FIG. 4 is a graph showing the relationship between the distance from each of electric supply portions and the potential of one of a pair of transparent electrodes.

Three types of transparent electrodes different in thickness gradient and transparent electrodes constant in thickness are shown in FIG. 4, as well as FIG. 2.

As is clear from FIGS. 2 and 4, in the case where the thickness of each of the transparent electrodes is reduced with the increase of the distance from a corresponding one of the electric supply portions, the potential of one of the transparent electrodes decreases with the increase of the distance from each of the electric supply portions.

Figure 5:
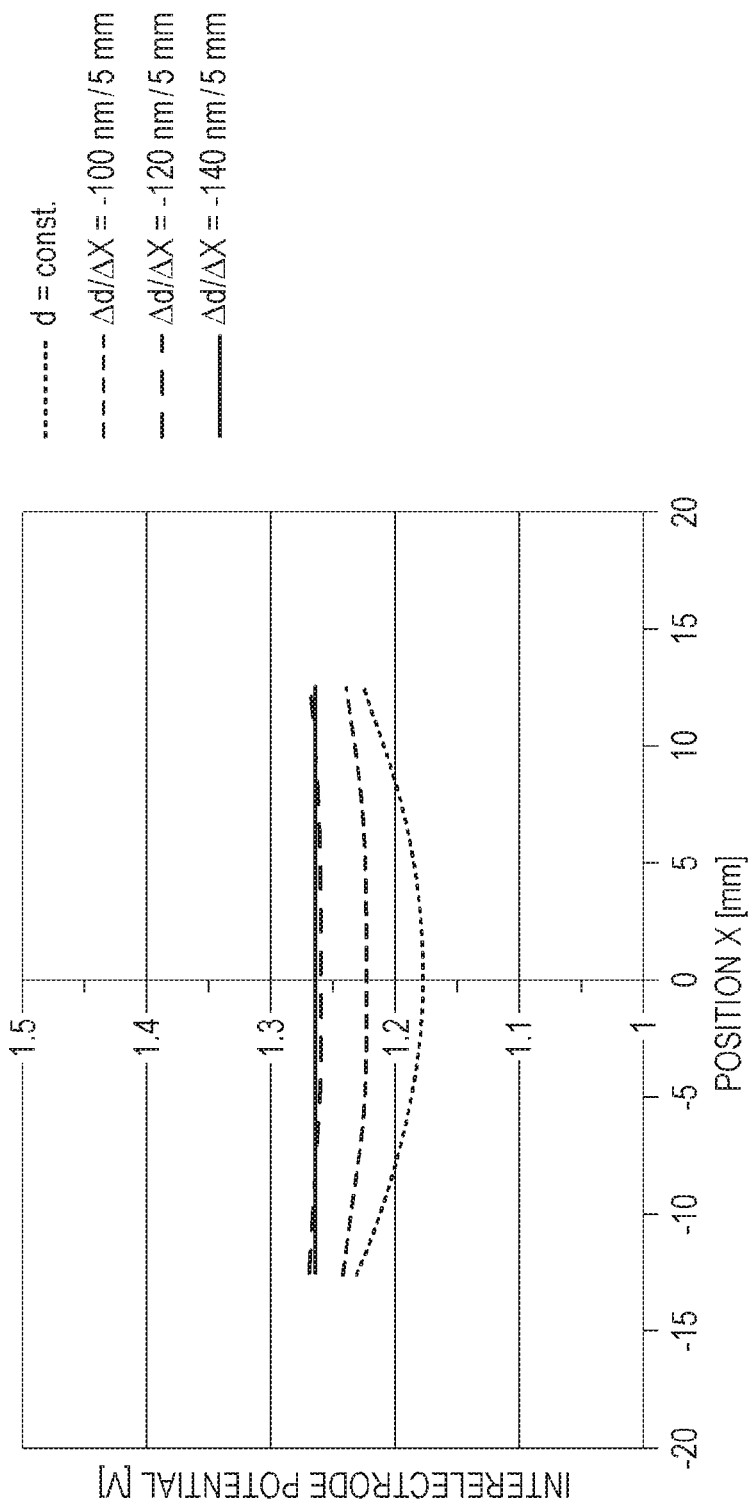
FIG. 5 is a graph showing the relationship between a position X in a surface of each of transparent electrodes and the potential difference between the transparent electrodes.

FIG. 5 is a graph showing the relationship between the distance from each of electric supply portions and the potential difference between a pair of transparent electrodes in the case where the thickness of each of the transparent electrodes decreases with the increase of the distance from a corresponding one of the electric supply portions. Three types of transparent electrodes different in thickness gradient and transparent electrodes constant in thickness are shown in FIG. 5, as well as FIG. 2.

As is clear from FIG. 5, in an electrochromic element including the transparent electrodes constant in thickness, the non-uniformity of the potential difference between the transparent electrodes is up to 50.8 mV. In an example in which the thickness gradient of transparent electrodes is −140 nm/5 mm, the non-uniformity of the potential difference between the transparent electrodes is very small, up to 2.3 mV. When transparent electrodes have a thickness gradient, the transmittance non-uniformity due to the non-uniformity of the potential difference between the transparent electrodes can be reduced.

Thus, it is clear that as the absolute value of the thickness gradient of the transparent electrodes is larger, the non-uniformity of the potential difference between the transparent electrodes is smaller in a surface of each transparent electrode. In order to reduce the non-uniformity of the potential difference between the transparent electrodes in a surface of each transparent electrode, the absolute value of the thickness gradient of the transparent electrodes is preferably |−100 nm/5 mm| or more, that is, 20 nm/mm or more.

Figure 6:
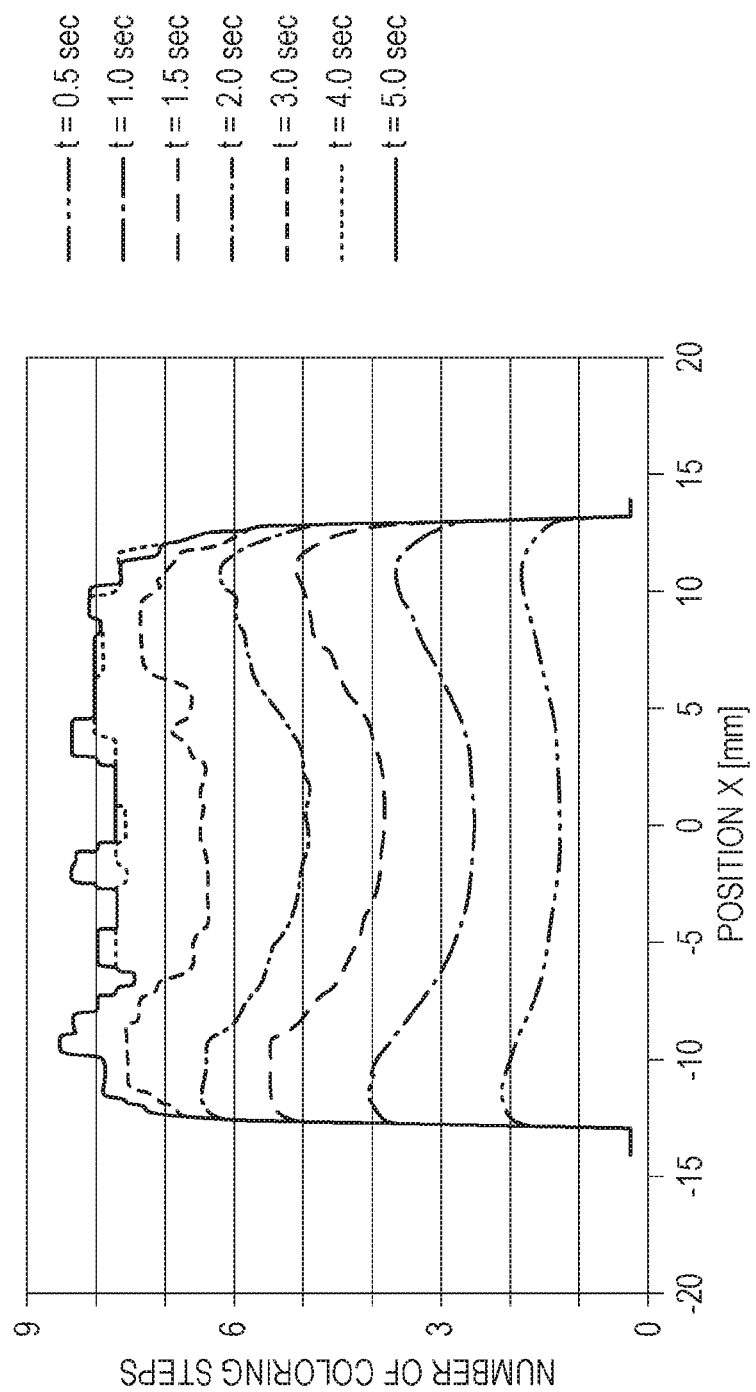
FIG. 6 is a graph showing the relationship between a position X in a surface of each transparent electrode constant in thickness and the number of coloring steps.

FIG. 6 is a graph obtained by varying the transmittance of an electrochromic element outside the scope of the disclosure, particularly an electrochromic element including transparent electrodes constant in thickness. In FIG. 6, the abscissa axis represents the distance from each electric supply portion and the ordinate axis represents the number of coloring steps. As the number of coloring steps is large, the transmittance is lower. In the electrochromic element outside the scope of the disclosure, the transmittance differs in a surface of each transparent electrode. In particular, the color density of the center of the electrochromic element is low and the color density of a portion close to the electric supply portion is high. In FIG. 6, the difference of color density is up to two steps.

The electrochromic element according to the first embodiment can reduce transmittance non-uniformity in a direction perpendicular to a principal surface of each of the transparent electrodes because the thickness of each of the transparent electrodes decreases with the increase of the distance from a corresponding one of the electric supply portions.

Second Embodiment

Figure 1B:
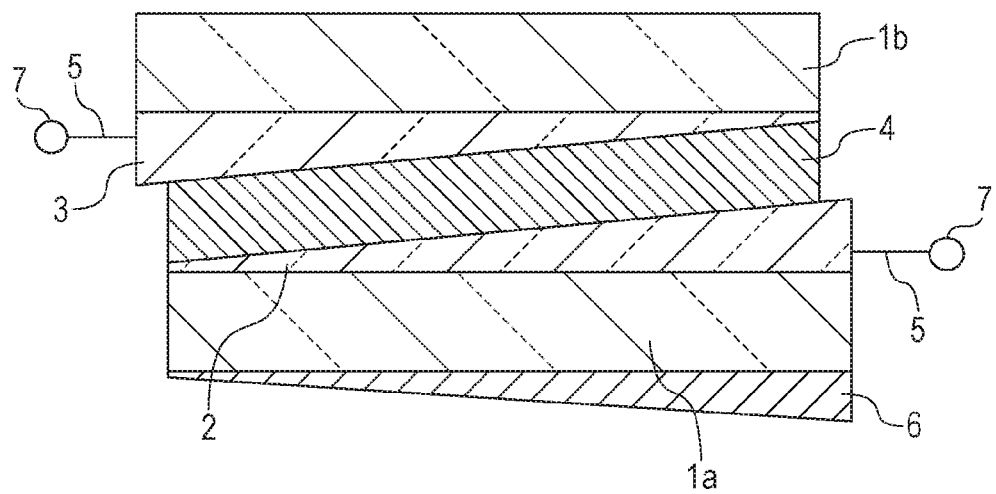
FIG. 1B is a schematic view of an electrochromic element according to a second embodiment.

FIG. 1B shows an electrochromic element according to a second embodiment. The second embodiment is different from the first embodiment in that the electrochromic element includes a transmittance compensation layer 6. The transmittance compensation layer 6 is placed in a position which is on the optical path of light passing through a pair of transparent electrodes and which is outside a pair of transparent substrates.

When one of the transparent substrates is located inside and the other is located outside, the transmittance compensation layer 6 is preferably placed on one of the transparent substrates that is located inside.

The transmittance compensation layer 6 is placed for the purpose of reducing the transmittance non-uniformity of the electrochromic element. The use of the reduction in transmittance non-uniformity due to the transmittance compensation layer 6 in addition to the reduction in transmittance non-uniformity due to the thickness gradient of the transparent electrodes enables transmittance non-uniformity to be further reduced.

When the transparent electrodes are made of different materials, the transmittance compensation layer 6 can be preferably used. This is because when the transparent electrodes are made of different materials, transmittance non-uniformity is not sufficiently reduced by the thickness gradient of the transparent electrodes only in some cases.

Third Embodiment

Figure 7:
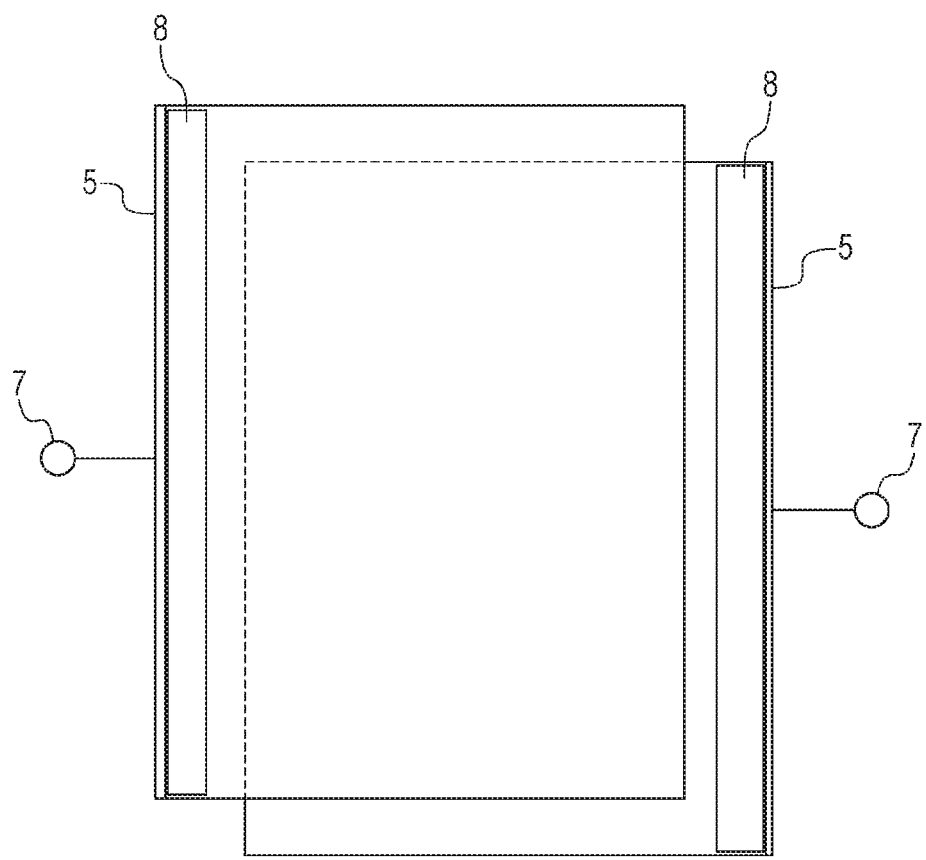
FIG. 7 is a schematic view of an electrochromic element according to a third embodiment.

FIG. 7 shows an electrochromic element according to a third embodiment. The third embodiment is different from the first embodiment in that the electrochromic element includes low-resistance portions 8. Electric supply portions 7 may be linear as shown in FIG. 6 or may be dot-shaped unlike FIG. 6.

The electric supply portions 7 are each placed on a region not overlapping an electrochromic element and are not involved in the transmission of light. The presence of the electric supply portions 7 enables the voltage drop of a region ranging from the electric supply portions 7 to transparent electrodes to be reduced. Other members used in electrochromic element A transparent substrate used in an electrochromic element according to an embodiment is a glass substrate or the like. The glass substrate may be made of quartz glass, white glass, borosilicate glass, alkali-free glass, chemically strengthened glass, or the like. From the viewpoint of durability, an alkali-free glass substrate can be preferably used.

Transparent electrodes included in the electrochromic element may be made of a so-called transparent conductive oxide such as tin-doped indium oxide (ITO), zinc oxide, gallium-doped zinc oxide (GZO), aluminium-doped zinc oxide, oxide (AZO), tin oxide, antimony-doped tin oxide (ATO), fluorine-doped tin oxide (FTO), or niobium-doped titanium oxide (TNO).

An electrochromic layer included in the electrochromic element contains an organic compound. The electrochromic layer may be solid or liquid.

When the electrochromic layer is solid, an electrolyte layer is preferably placed between the electrochromic layer and an electrode.

When the electrochromic layer is liquid, the electrochromic layer preferably contains an electrolyte.

The electrolyte is not particularly limited and may be an ionically dissociable salt which is well soluble in solvents and which is highly compatible with solid electrolytes. In particular, the electrolyte preferably has electron-donating ability. The electrolyte can also be referred to as a supporting electrolyte.

Examples of the electrolyte include various inorganic ionic salts such as alkali metal salts and alkaline-earth metal salts, quaternary ammonium salts, and cyclic quaternary ammonium salts.

Specific examples of the electrolyte include alkali metal salts such as $LiClO_4$, $LiSCN$, $LiBF_4$, $LiAsF_6$, $LiCF_3SO_3$, $LiPF_6$, $LiI$, $NaI$, $NaSCN$, $NaClO_4$, $NaBF_4$, $NaAsF_6$, $KSCN$, and $KCl$, containing Li, Na, or K; quaternary ammonium salts such as $(CH_3)_4NBF_4$, $(C_2H_5)_4NBF_4$, $(n-C_4H_9)_4NBF_4$, $(n-C_4H_9)_4NPF_6$, $(C_2H_5)_4NBr$, $(C_2H_5)_4NClO_4$, and $(n-C_4H_9)_4NClO_4$; and cyclic quaternary ammonium salts.

A solvent that dissolves an electrochromic organic compound and the electrolyte is not particularly limited and may be one that can dissolve the electrochromic organic compound and the electrolyte. In particular, the solvent preferably has polarity.

Examples of the solvent include water and organic polar solvents such as methanol, ethanol, propylene carbonate, ethylene carbonate, dimethyl sulfoxide, dimethoxyethane, γ-butyrolactone, γ-valerolactone, sulfolane, dimethylformamide, tetrahydrofuran, acetonitrile, propionitrile, benzonitrile, dimethylacetamide, methylpyrrolidinone, and dioxolane.

An electrochromic medium which contains a polymer or a gelling agent and which has high viscosity or which is gelatinous can be used.

The polymer is not particularly limited. Examples of the polymer include polyacrylonitrile, carboxymethylcellulose, polyvinyl chloride, polyethylene oxide, polypropylene oxide, polyurethane, polyacrylate, polymethacrylate, polyamide, polyacrylamide, polyester, and Nafion®.

An electrochromic compound contained in the electrochromic layer may be any compound that is varied in transmittance by oxidation or reduction. In particular, the electrochromic compound is preferably a thiophene-containing compound, a phenazine-containing compound, or a viologen-containing compound.

An optical filter according to an embodiment of includes the electrochromic element and an active element connected to the electrochromic element. The active element applies a voltage to the electrochromic element to regulate the amount of light passing through the electrochromic element.

Examples of the active element include amplifying elements and switching elements. In particular, the active element is a transistor or a metal-insulator-metal (MIM) element. The transistor may include an active region containing an oxide semiconductor such as InGaZnO.

A lens unit according to an embodiment includes the optical filter and an imaging optical system. The optical filter can regulate light passing through the imaging optical system or the amount of light passing through the imaging optical system. The imaging optical system is a lens group including a plurality of lenses.

The optical filter, which is included in the lens unit, may be placed between lenses or may be attached to an outer portion of the lens unit.

An imaging device according to an embodiment includes the optical filter and an imaging element receiving light passing through the optical filter.

In the case where the lens unit is detachably attached to the imaging device, the optical filter may be placed between the lens unit and the imaging element.

When the imaging device includes the imaging optical system, the optical filter may be placed between lenses or between a lens and the imaging element or the optical filter may be placed such that the imaging optical system is located between the optical filter and the imaging element.

The imaging device is, for example, a digital camera or a digital video camera.

In the case of using the electrochromic element in the imaging device, such as a camera, the amount of light can be reduced without reducing the gain of the imaging element.

A window member according to an embodiment includes a pair of transparent substrates, the electrochromic element, and an active element connected to the electrochromic element. The electrochromic element is placed between the transparent substrates. The electrochromic element can regulate the amount of light passing through the transparent substrates. Adding a member such as a window frame to the window member provides a window. The window member can be used for automotive windows, airplane windows, building material windows, and the like.

Figure 8:
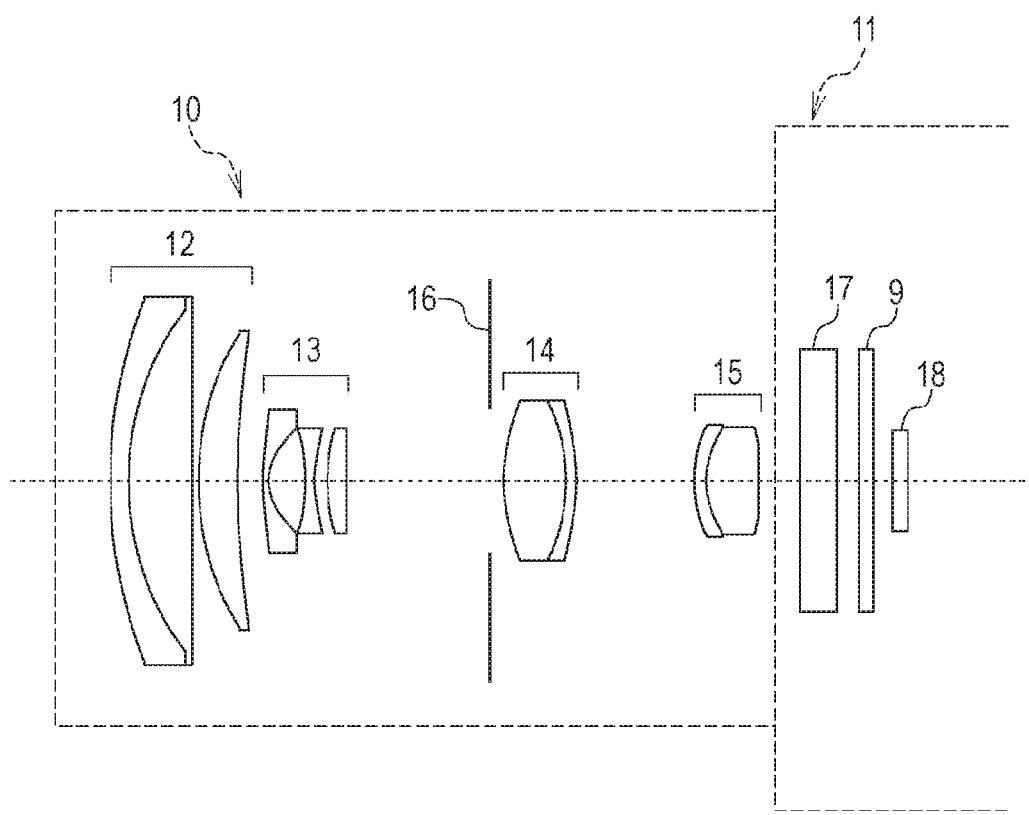
FIG. 8 is a schematic view of an example of an imaging device according to an embodiment.

FIG. 8 is a schematic view of an imaging device according to an embodiment.

The imaging device includes a lens unit 10 and an imaging unit 11. The lens unit 10 is detachably connected to the imaging unit 11 with a mount member (not shown) therebetween. An optical filter 9 is placed in the imaging unit 11.

The lens unit 10 includes a plurality of lenses or a lens group and is a rear focus-type zoom lens that performs focusing on the side closer to an imaging element than a diaphragm.

The lens unit 10 includes four lens groups: a first lens group 12 with positive refractive power, a second lens group 13 with negative refractive power, a third lens group 14 with positive refractive power, and a fourth lens group 15 with positive refractive power. The first lens group 12, the second lens group 13, the third lens group 14, and the fourth lens group 15 are arranged in that order from an object. The lens unit 10 further includes a diaphragm 16 placed between the second lens group 13 and the third lens group 14. Zooming is performed by varying the distance between the second lens group 13 and the third lens group 14. Focusing is performed by moving a lens sub-group of the fourth lens group 15. Members are arranged such that light passing through the first to fourth lens groups 12 to 15, the diaphragm 16, and the optical filter 9 is received by the imaging element. The amount of light received by the imaging element can be regulated using the diaphragm 16 and the optical filter 9. The imaging unit 11 includes a glass block 17 and an imaging element 18. The optical filter 9 is placed between the glass block 17 and the imaging element 18.

The glass block 17 is a low-pass filter, a faceplate, a color filter, or the like.

The imaging element 18 serves as a sensor section receiving light passing through the lens unit 10 and may be a charge-coupled device (CCD), a complementary metal-oxide semiconductor (CMOS) device, or the like. Alternatively, the imaging element 18 may be a photosensor such as a photodiode. The imaging element 18 may be one capable of acquiring and outputting information about the intensity or wavelength of light.

In the imaging device, for example, the optical filter 9 is placed between the glass block 17 in the imaging unit 11 and the imaging element 18. In the imaging device, the position of the optical filter 9 is not particularly limited and the optical filter 9 may be placed between, for example, the third lens group 14 and the fourth lens group 15 or may be placed outside the lens unit 10.

Placing the optical filter 9 in a position where light converges provides an advantage that the area of the optical filter 9 can be reduced. In the imaging device, the morphology of the lens unit 10 can be appropriately selected and the lens unit 10 may be of a rear focus type, an inner focus type in which focusing is performed in advance of a diagram, or another type. A special lens, such as a fish-eye lens or a macro-lens, other than a zoom lens can be appropriately selected.

The imaging device exemplifies a product having a combination of a light regulator and an imaging element or the like and may be, for example, an imaging member for cameras, digital cameras, video cameras, digital video cameras, mobile phones, smartphones, personal computers (PCs), tablets, and the like.

In this embodiment, a rear focus-type zoom lens that performs focusing in the rear of a diaphragm is shown.

Figure 9A:
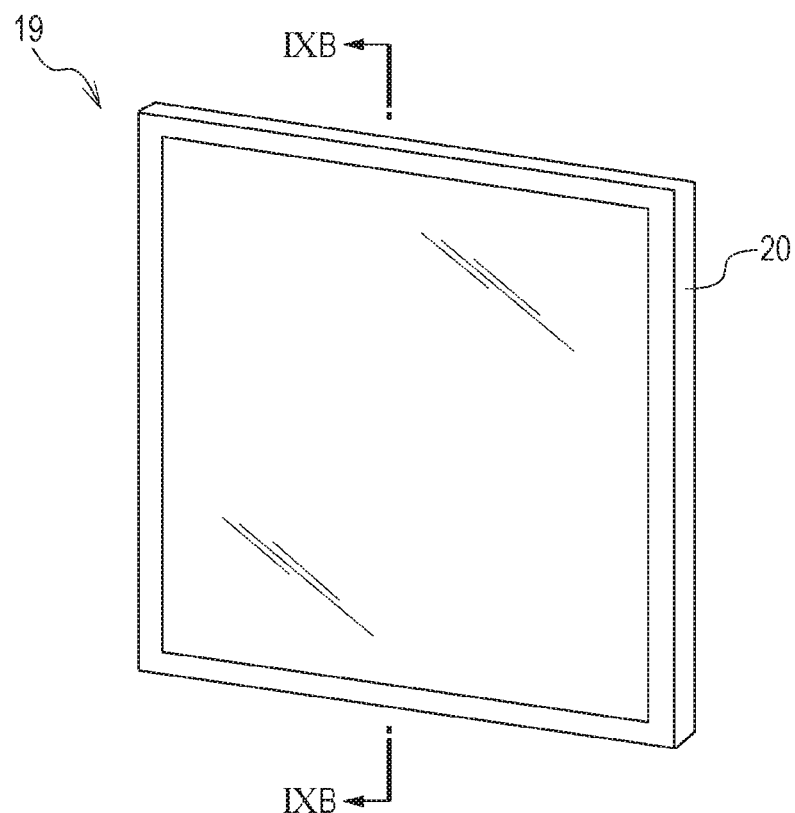
FIG. 9A is a schematic view of an example of a window member according to an embodiment.
Figure 9B:
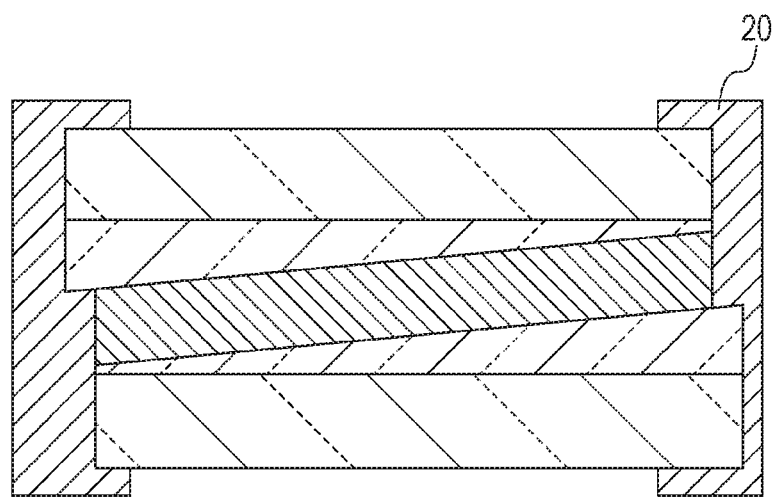
FIG. 9B is a schematic sectional view taken along the line IXB-IXB in FIG. 9A.

FIG. 9A is a schematic view of an example of a window member according to an embodiment. A dimming window 19 includes a window frame 20. The window frame 20 retains an electrochromic element as shown in FIG. 9B. The electrochromic element shown in FIG. 9B is the same as that shown in FIG. 1A and therefore reference numerals are omitted.

According to an embodiment, the following element can be provided: an electrochromic element in which the resistivity of a pair of electrodes is varied depending on the distance from an electric supply portion such that transmittance non-uniformity in a surface of each electrode is reduced.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-079477, filed Apr. 8, 2015, which is hereby incorporated by reference herein in its entirety.

What is claimed is:

1. An electrochromic element comprising:
a pair of transparent electrodes; and
an electrochromic layer placed between the transparent electrodes,
wherein each of the transparent electrodes includes an end portion having an electric supply portion, the electric supply portions disposed at an opposite side each other,
the surface resistivity of each of the transparent electrodes increases with an increase of distance from one of the electric supply portions, and a potential of the transparent electrodes is such that a difference between maximum and minimum potentials in a surface of each transparent electrode is less than or equal to 20 mV.

2. The electrochromic element according to claim 1, further comprising:
a pair of transparent substrates; and
a transmittance compensation layer,
wherein the electrochromic element is placed between the transparent substrates and the transmittance compensation layer is placed in a position which is on an optical path of light passing through the transparent electrodes and which is outside the transparent substrates.

3. The electrochromic element according to claim 1, wherein a thickness of each of the transparent electrodes decreases with the increase of the distance from one of the electric supply portions.

4. The electrochromic element according to claim 3, wherein the thickness of each of the transparent electrodes decreases in proportion to the distance from one of the electric supply portions.

5. The electrochromic element according to claim 4, wherein corresponding positions in the transparent electrodes have the same thickness.

6. An optical filter comprising:
the electrochromic element according to claim 1; and
an active element connected to the electrochromic element.

7. The optical filter according to claim 6, wherein the active element applies a voltage to the electrochromic element to regulate the amount of light passing through the electrochromic element.

8. A lens unit comprising:
an imaging optical system including a plurality of lenses; and
the optical filter according to claim 6.

9. An imaging device comprising:
an imaging optical system including a plurality of lenses;
the electrochromic element according to claim 1; and
an imaging element receiving light passing through the electrochromic element.

10. An imaging device capable of being attached to an imaging optical system including a plurality of lenses, comprising:
the electrochromic element according to claim 1; and
an imaging element receiving light passing through the electrochromic element.

11. A window member comprising:
a pair of transparent substrates;
the electrochromic element according to claim 1, the electrochromic element being placed between the transparent electrodes; and
an active element connected to the electrochromic element,
wherein the amount of light passing through the transparent electrodes is regulated using the electrochromic element.

12. The window member according to claim 11, wherein the active element applies a voltage to the electrochromic element to regulate the amount of light passing through the electrochromic element.

13. The electrochromic element according to claim 1, wherein the electrochromic layer comprises an electrochromic material and an electrolyte.

14. The electrochromic element according to claim 13, wherein the electrochromic layer is of a solution state.

15. An electrochromic element comprising:
a pair of electrodes; and
an electrochromic layer disposed between the pair of electrodes,
wherein each of the electrodes includes an electric supply portion at one of the ends of the electrode,
the electrode has a resistivity change region disposed between a region A and a region B, in an electrode plane,
the region A is disposed between the electric supply portion and the resistivity change region, and
the resistivity of the region A is lower than the resistivity of the region B, and
the potential difference between the region A and the region B is 20 mV or less.

* * * * *